No. 821,205. PATENTED MAY 22, 1906.
J. P. TRIOLO.
MEANS TO CURE FRUIT FOR TRANSPORTATION.
APPLICATION FILED DEC. 18, 1905.
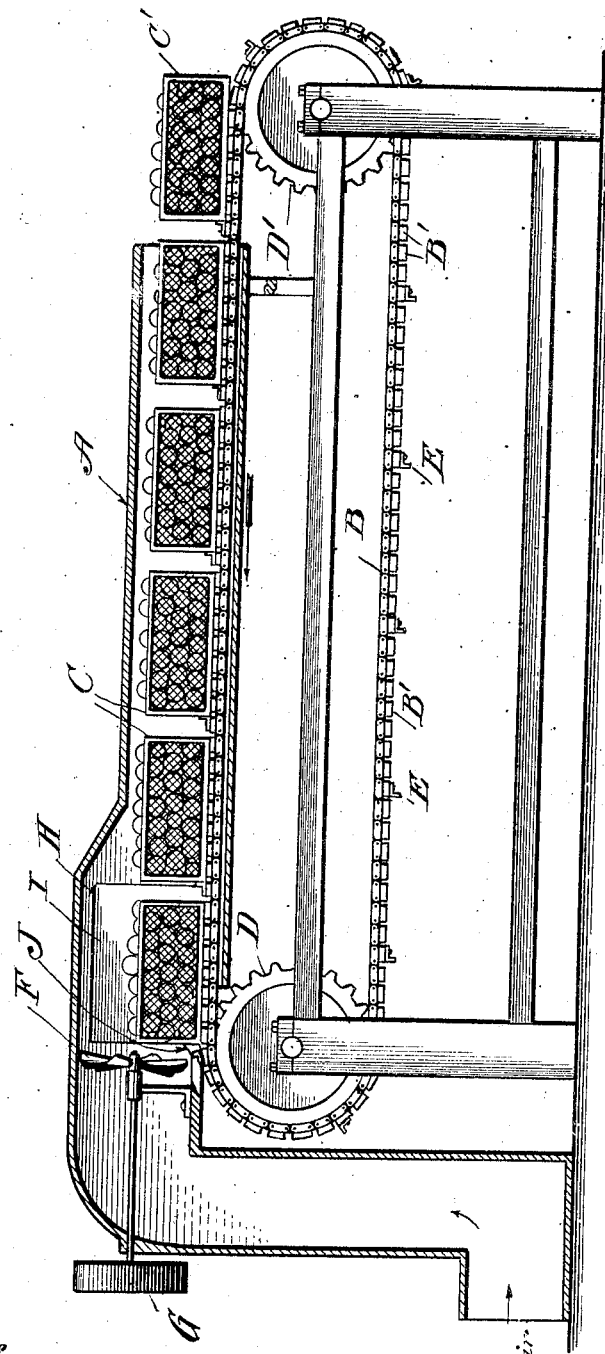
Witnesses
Inventor
John P. Triolo
By Hazard & Harpham
Attorneys.

UNITED STATES PATENT OFFICE.

JOHN P. TRIOLO, OF CORONA, CALIFORNIA.

MEANS TO CURE FRUIT FOR TRANSPORTATION.

No. 821,205.  Specification of Letters Patent.  Patented May 22, 1906.

Application filed December 12, 1905. Serial No. 292,376.

*To all whom it may concern:*

Be it known that I, JOHN P. TRIOLO, a citizen of the United States, residing at Corona, in the county of Los Angeles and State of California, have invented new and useful Improvements in Means to Cure Fruit for Transportation, of which the following is a specification.

The object of my invention is to provide simple and inexpensive means to cure fruit for transportation; and it is more particularly adapted to cure citrus fruit for long-distance transportation. I accomplish this object by means of the apparatus described herein and shown in the accompanying drawing, which is a central longitudinal section of my device, partly in elevation.

My invention consists, essentially, of a long horizontal chamber A, air-tight on the top, bottom, and sides thereof, arranged to receive and permit the passage therethrough of an endless fruit-carrying belt B, upon which the fruit-trays C are placed. This endless belt is arranged to pass along and over the bottom of the chamber. The carrying-belt moved by sprockets D is divided into a number of sections B', each section being adapted to receive one fruit-tray. These sections are divided one from the other by means of the outwardly-projecting lugs E on the carrying-belt, which prevent the fruit-trays from slipping thereon. The carrying-belt is constructed so as to readily permit the passage of air therethrough. The fruit to be cured is first placed in the trays C. When a tray is filled with fruit, it is placed upon the carrying-belt immediately above the sprocket D' and is marked on the drawing C'. The casing of the chamber terminates before it reaches a point above the sprocket D' to afford means for the ready placement of the tray on the carrying-belt. When the tray C' is placed on the section of the carrying-belt not covered by the casing of the air-chamber, it is pushed into the chamber by hand, causing the endless belt to move, which will carry with it all the fruit-trays thereon forwardly from the foot to the head of the drying-chamber. The upwardly-projecting lugs E will prevent the trays from sliding on the belt and will cause the belt to move, carrying forward the trays thereon. At the head of the casing A, I have placed a blower F, having means for its rotation. In this case I have shown a driving-pulley G, keyed on the same shaft which carries the blower. When it is desired to cure or dry fruit by means of this apparatus, motion is imparted to the blower through the driving-pulley. This will cause the air to pass in at the head or front of the chamber and pass along through the same and through the trays and the fruit contained therein and out at the foot of the chamber. This will absorb the moisture contained in the rind of the fruit. At the head of the chamber I have provided an opening H to remove the trays from the chamber. The door I will form an air-tight closure for this opening, which is kept closed at all times, except when removing a tray from the chamber.

When motion is imparted to the carrying-belt by crowding the tray last placed thereon forwardly after the removal of the tray at the head of the chamber, (which contains the fruit then sufficiently cured for transportation,) I have provided a tray-stop J, against which the tray at the head of the chamber will contact and stop the further movement forward of the tray, and consequently stop the carrying-belt and all the trays thereon. When the fruit in the tray at the head of the apparatus is sufficiently cured for transportation, the door I is opened and the tray removed, the door is again closed, and a new tray is placed on the foot of the belt and pushed forwardly into the chamber, as hereinbefore described, bringing another tray to the head of the chamber opposite the door I, which when sufficiently cured is in turn removed.

I have found by experience that the passage of air under a forced draft over and around citrus fruits for a considerable period of time will remove moisture contained in the rind of the fruit and place the fruit in condition for transportation, and my apparatus is well adapted for that purpose.

Having described my invention, what I claim as new, and desire to secure by Letters Patent, is—

1. Means to cure citrus fruits for transportation, comprising a chamber closed on the top, bottom and sides; an endless fruit-carrying belt adapted to pass along the bottom thereof, the said belt being provided with projecting lugs dividing the belt into tray-receiving sections; fruit-receiving trays on said fruit-carrying belt; a stop in said chamber adapted to contact with the tray at the head of the chamber, an opening in said chamber at the head thereof for the removal of the tray; a closure therefor, and means to cause air to pass through said chamber.

2. The herein-described means to cure citrus fruit for transportation, comprising the chamber A, the endless fruit-carrying belt B adapted to pass along the bottom of said chamber, the said belt passing around sprocket-wheels D and carried thereby; an opening H in the head of the chamber for the removal of the fruit-trays; a door I adapted to form a closure for said opening and a blower F adapted upon the rotation thereof to cause a current of air to pass in at the head of the chamber and out at the foot thereof.

In witness that I claim the foregoing I have hereunto subscribed my name this 2d day of December, 1905.

JOHN P. TRIOLO.

Witnesses:
HENRY T. HAZARD,
EDMUND A. STRAUSE.